(12) United States Patent
Limage et al.

(10) Patent No.: US 11,873,411 B2
(45) Date of Patent: Jan. 16, 2024

(54) INK COMPRISING SILVER NANOPARTICLES

(71) Applicant: GENES'INK SA, Rousset (FR)

(72) Inventors: Stephanie Limage, La Bouilladisse (FR); Corinne Versini, Aix en Provence (FR); Louis-Dominique Kauffmann, Aix en Provence (FR); Rita Faddoul, Trets (FR)

(73) Assignee: GENES'INK SA, Rousset (FR)

( * ) Notice: Subject to any disclaimer, the term of this patent is extended or adjusted under 35 U.S.C. 154(b) by 385 days.

(21) Appl. No.: 17/309,623

(22) PCT Filed: Dec. 4, 2019

(86) PCT No.: PCT/EP2019/083643
§ 371 (c)(1),
(2) Date: Jun. 10, 2021

(87) PCT Pub. No.: WO2020/120252
PCT Pub. Date: Jun. 18, 2020

(65) Prior Publication Data
US 2022/0025200 A1  Jan. 27, 2022

(30) Foreign Application Priority Data

Dec. 13, 2018 (FR) .................................. 1872892

(51) Int. Cl.
*C09D 11/38* (2014.01)
*C09D 11/36* (2014.01)
*C09D 11/52* (2014.01)
*B82Y 40/00* (2011.01)

(52) U.S. Cl.
CPC .............. *C09D 11/38* (2013.01); *C09D 11/36* (2013.01); *C09D 11/52* (2013.01); *B82Y 40/00* (2013.01)

(58) Field of Classification Search
CPC ..... B41J 3/4078; B41M 7/0018; B82Y 40/00; C09D 11/54; C09D 11/033; C09D 11/52; C09D 11/36; C09D 11/38; C09D 11/40; D06P 1/525; D06P 1/5278; D06P 1/5285; D06P 5/002; D06P 5/2072; D06P 5/30
See application file for complete search history.

(56) References Cited

U.S. PATENT DOCUMENTS

2007/0034052 A1\* 2/2007 Vanheusden .............. C22B 3/20
75/362
2012/0097059 A1  4/2012 Allemand et al.

FOREIGN PATENT DOCUMENTS

| FR | 3013607 A1 | 5/2015 |
| WO | 2015000796 A1 | 1/2015 |
| WO | 2016184979 A1 | 11/2016 |

OTHER PUBLICATIONS

Translation of International Search Report dated Feb. 25, 2020 in PCT Application No. PCT/EP2019/083643.

\* cited by examiner

*Primary Examiner* — Thinh H Nguyen
(74) *Attorney, Agent, or Firm* — MASCHOFF BRENNAN

(57) ABSTRACT

The present invention relates to ink formulations based on silver nanoparticles. In particular, the present invention relates to ink formulations based on silver nanoparticles, said inks being stable, with improved conductivity and particularly suitable for the field of contactless inkjet printing.

16 Claims, No Drawings

INK COMPRISING SILVER NANOPARTICLES

FIELD OF THE INVENTION

The present invention relates to ink formulations based on silver nanoparticles. In particular, the present invention relates to ink formulations based on silver nanoparticles, said inks being stable, with improved conductivity and particularly suitable for the inkjet-type contactless printing technology.

Similar inks have already been described by the Applicant in its patent application WO 2016/184979 (A1) published on 24 Nov. 2016.

More particularly, the present invention relates to ink formulations based on silver nanoparticles, said inks being characterized by a set of improved properties, among which mention will be made for illustrative purposes of:
- greater stability, and/or
- an improved surface tension, and/or
- better annealing (homogeneity of the deposit), and/or
- absence of generation of bubbles/foams during printing, and/or
- excellent conductivity after drying at room temperature.

More particularly, the present invention relates to the field of inks based on conductive nanoparticles that are suitable not only for inkjet-type contactless printing technology, but also for slot die coating, spraying, coating ("blade coating"), pad printing, flexography and/or etching.

The inks based on conductive nanoparticles according to the present invention may be printed on all types of supports. Examples that will be mentioned include the following supports: polymers and polymer derivatives, composite materials, organic materials, and/or inorganic materials; in particular paper.

The inks based on conductive nanoparticles according to the present invention have many advantages, among which mention will be made as non-limiting examples of:
- stability over time superior to that of the current inks;
- an improved surface tension;
- non-toxicity of the solvents and of the nanoparticles;
- conservation of the intrinsic properties of the nanoparticles; and in particular
- improved conductivity for annealing temperatures generally between 120° C. and 300° C.; and/or
- excellent conductivity after drying at room temperature.

The present invention also relates to an improved method for preparing said inks; finally, the present invention also relates to the use of said inks in the field of inkjet-type contactless printing, slot die coating, spraying, coating ("blade coating"), pad printing, flexography and/or etching.

BACKGROUND

In the light of the literature in recent years, conductive colloidal nanocrystals have received a great deal of attention on account of their novel optoelectronic, photovoltaic and catalytic properties. This makes them particularly advantageous for future applications in the field of nanoelectronics, solar cells, sensors and the biomedical field.

The development of conductive nanoparticles makes it possible to afford new uses and to envisage a multitude of new applications. Nanoparticles have a very large surface area/volume ratio and substitution of their surface with surfactants entails a change in certain properties, notably optical properties, and the possibility of dispersing them.

Their small sizes can lead in certain cases to quantum confinement effects. The term "nanoparticles" is used when at least one of the dimensions of the particle is less than or equal to 250 nm. The nanoparticles may be beads (from 1 to 250 nm), rods (L<200 to 300 nm), wires (a few hundred nanometres or even a few microns), discs, stars, pyramids, tetrapods, cubes or crystals when they have no predefined shape.

Several processes have been developed for synthesizing conductive nanoparticles. Among these, mention may be made in a non-exhaustive manner of:
- physical processes: chemical vapor deposition (CVD) when a substrate is exposed to volatilized chemical precursors which react or decompose on its surface. This process generally leads to the formation of nanoparticles whose morphology depends on the conditions used; thermal evaporation; molecular beam epitaxy when atoms which will constitute the nanoparticles are bombarded at high speed into the substrate (where they become bound), in the form of a gas stream;
- chemical or physicochemical processes: microemulsion; laser pulse in solution, when a solution containing a precursor is irradiated with a laser beam. The nanoparticles become formed in the solution along the laser beam; synthesis by microwave irradiation; surfactant-assisted oriented synthesis; ultrasound-mediated synthesis; electrochemical synthesis; organometallic synthesis; synthesis in alcoholic medium.

Physical syntheses consume more starting materials with significant losses. They generally take time and require high temperatures, which makes them unattractive for passing to industrial-scale production. This makes them unsuitable for certain substrates, for example flexible substrates. Furthermore, the syntheses are performed directly on the substrates in small-sized frameworks. These production methods prove to be relatively rigid and do not allow production on large-sized substrates; they may, however, be entirely suitable for the production of the silver nanoparticles used in the ink formulations according to the present invention.

Chemical syntheses, for their part, have many advantages. The first is that of working in solution: the conductive nanoparticles thus obtained are already dispersed in a solvent, which facilitates the storage and use thereof. In the majority of cases, the nanoparticles are not attached to a substrate at the end of the synthesis, which affords greater latitude in their use. This opens the way to the use of substrates of different sizes and of different nature. These methods also allow better control of the starting materials used and limit the losses. Correct adjustment of the synthetic parameters leads to good control of the synthesis and the growth kinetics of the conductive nanoparticles. This makes it possible to ensure good reproducibility between batches and also good control of the final morphology of the nanoparticles. The ability to chemically produce nanoparticles rapidly and in large amount while at the same time ensuring a certain flexibility as regards the product makes it possible to envisage industrial-scale production. The production of dispersed conductive nanoparticles opens numerous perspectives regarding their customization. It is thus possible to adjust the nature of the stabilizers present at the surface of the nanoparticles according to the intended application. Specifically, various methods exist for wet deposition. In each case, particular attention must be paid to the physical properties of the ink such as the surface tension or the viscosity. The adjuvants employed during the formulation of the nanoparticle-based ink will make it possible to adhere to the requirements of the deposition method. However, the surface ligands will also have an impact on these parameters and their choice proves to be decisive. It is thus important to have an overall view of the ink in order to combine all the participating elements—nanoparticles, solvent, ligands and adjuvants—and to obtain a product that is compatible with the targeted applications.

DETAILED DESCRIPTION

The object of the present invention is to overcome one or more drawbacks of the prior art by providing an ink that is suitable for inkjet-type contactless printing, slot die coating, spraying, coating ("blade coating"), pad printing, flexography and/or etching and which comprises silver nanoparticles in high concentration, for example a stable dispersion of said silver nanoparticles. Said inks are characterized by a set of improved properties, among which mention will be made for illustrative purposes of:
  greater stability, and/or
  an improved surface tension, and/or
  better annealing (homogeneity of the deposit), and/or
  absence of generation of bubbles/foams during printing, and/or
  excellent conductivity after drying at room temperature.

Although the inks described in WO 2016/184979 (A1) already meet a large number of the requirements set hereinabove, the Applicant has managed to develop new ink compositions which make it possible to further improve both their performance and also their range of uses and thus of possible applications.

The present invention thus relates to an ink whose composition comprises at least
1. one compound "a" consisting of silver nanoparticles,
2. one compound "e" consisting of a mixture of solvents,
3. one compound "W" consisting of water,
  characterized in that
A. compound "a" constitutes at least 10% by weight of the ink composition,
B. compound "e" constitutes at least 55% by weight, preferably at least 60% by weight of the ink composition and consists of
  B.1. at least one aliphatic monohydric alcohol, and
  B.2. at least one terpenic alcohol, and
  B.3. at least one polyol and/or one polyol derivative, and
C. compound "W" constitutes at least 2.5% by weight of the ink composition, and
D. the sum of compounds "a", "e" and "W" constitutes at least 80% by weight of the ink composition.

The viscosity measured at 20° C. of the ink according to the present invention is generally between 2 and 2000 mPa·s, preferably between 5 and 1000 mPa·s, for example between 5 and 50 mPa·s, for example between 5 and 25 mPa·s.

The Applicant has discovered that the ink composition based on silver nanoparticles according to the present invention with the combination of compounds claimed and their respective concentration makes it possible to obtain an ink with improved properties, in particular improved stability, excellent jet-ability, and also improved conductivity in a range of viscosities that are particularly suitable for uses in the fields of contactless printing (inkjet) and also of slot die coating, spraying, coating ("blade coating"), pad printing, flexography and/or etching; in particular, the ink formulations based on silver nanoparticles according to the present invention have a set of improved properties, among which mention will be made for illustrative purposes of:
  greater stability, and/or
  an improved surface tension, and/or
  better annealing (homogeneity of the deposit), and/or
  absence of generation of bubbles/foams during printing, and/or
  excellent conductivity after drying at room temperature.

These improved properties, and in particular this greater stability, of the ink thus formulated are particularly unexpected on account of the improbable combination of solvents selected and of water; in point of fact, it is due to an accidental addition of water to a particular combination of solvents that the Applicant was able to observe this improved stability and thus to envisage the premises of the present invention.

The inks based on conductive nanoparticles according to the present invention may be printed on all types of supports. Examples that will be mentioned include the following supports: polymers and polymer derivatives, composite materials, organic materials, inorganic materials. The fact that the ink according to the present invention can be used at room temperature also makes it possible to broaden its field of use in terms of usable support. Mention will be made for illustrative purposes of
  printing on plastic (Tg<60° C.), for example PET, PVC (for example films for foodstuffs) and/or polystyrene,
  printing on coated or uncoated paper,
  printing on a biological substrate (for example organic and/or plant tissues),
  the production of biosensors, and/or
  printing on bulky components (for example walls, large-sized plastic components, etc.).

Compound "a" according to the present invention thus consists of silver nanoparticles.

According to one embodiment variant of the present invention, the objectives of the present invention are particularly achieved when compound "a" consists of silver nanoparticles with dimensions of between 1 and 250 nm. The size of the nanoparticles is defined as being the mean diameter of the particles containing silver, with the exclusion of the stabilizers, as determined, for example, by transmission electron microscopy.

According to one embodiment variant of the present invention, the silver nanoparticles are of spheroidal and/or spherical shape. For the present invention and the claims that follow, the term "of spheroidal shape" means that the shape resembles that of a sphere but it is not perfectly round ("quasi-spherical"), for example an ellipsoid shape. The shape of the nanoparticles is generally identified by means of photographs taken with a microscope. Thus, according to this embodiment variant of the present invention, the nanoparticles have diameters of between 1 and 250 nm.

According to one embodiment variant of the present invention, the silver nanoparticles are in the form of beads (from 1 to 250 nm), rods (L<200 to 300 nm), wires (a few hundred nanometres or even a few microns), cubes, platelets or crystals when they do not have a predefined form.

According to a particular embodiment of the present invention, the silver nanoparticles have been synthesized beforehand by physical synthesis or chemical synthesis. Any physical or chemical synthesis may be used in the context of the present invention. In one particular embodiment according to the present invention, the silver nanoparticles are obtained via a chemical synthesis which uses as silver precursor an organic or inorganic silver salt. Non-limiting examples that will be mentioned include silver acetate, silver nitrate, silver carbonate, silver phosphate, silver trifluorate, silver chloride, silver perchlorate, alone or as a mixture. According to one variant of the present invention, the precursor is silver acetate.

Thus, the nanoparticles that are preferentially used in the present invention are characterized by D50 values which are preferentially between 1 and 250 nm irrespective of their method of synthesis (physical or chemical); they are also preferably characterized by a monodisperse (homogeneous) distribution without aggregates. D50 values of between 10 and 150 nm for spheroidal silver nanoparticles may also be advantageously used.

Compound "W" which constitutes at least 2.5% by weight of the ink composition according to the present invention thus consists of water. In particular, the water content in the ink composition according to the present invention is at least 3% by weight, for example at least 4% by weight; it is preferably less than 15% by weight, for example less than 10% by weight.

Compound "e" which constitutes at least 55%, preferably at least 60%, by weight of the ink composition according to the present invention thus consists of a mixture of solvents which consists of B.1. at least one aliphatic monohydric alcohol, and
B.2. at least one terpenic alcohol, and
B.3. at least one polyol and/or one polyol derivative.

In particular, the content of aliphatic monohydric alcohol in the ink composition according to the present invention is at least 5% by weight, for example at least 10% by weight; it is preferably less than 25% by weight, for example less than 20% by weight.

In particular, the content of terpenic alcohol in the ink composition according to the present invention is at least 10% by weight, for example at least 15% by weight; it is preferably less than 35% by weight, for example less than 30% by weight.

In particular, the content of polyol and polyol derivative in the ink composition according to the present invention is at least 20% by weight, for example at least 30% by weight; it is preferably less than 50% by weight, for example less than 45% by weight.

The aliphatic monohydric alcohol is preferably selected from the group consisting of ethanol, propanol, butanol, pentanol and hexanol and also isomers thereof (for example isopropanol, n-butanol, tert-butanol), and/or a mixture of two or more of said aliphatic monohydric alcohols.

The terpenic alcohol is preferably selected from menthol, nerol, cineol, lavandulol, myrcenol, terpineol (alpha-, beta-, gamma-terpineol, and/or terpinen-4-ol; preferably alpha-terpineol), isoborneol, citronellol, linalool, borneol, geraniol, and/or a mixture of two or more of said alcohols; a mixture of alpha-terpineol and of gamma-terpineol has proven to be particularly suitable.

The polyol and/or polyol derivative is preferably characterized by a boiling point of less than 260° C. Examples that will be mentioned include glycols (for example ethylene glycol, propylene glycol, diethylene glycol, trimethylene glycol, 1,3-butylene glycol, 1,2-butylene glycol, 2,3-butylene glycol, pentamethylene glycol, hexylene glycol, etc.), and/or glycol ethers (for example glycol monoethers or diethers, among which examples that will be mentioned include ethylene glycol propyl ether, ethylene glycol butyl ether, ethylene glycol phenyl ether, propylene glycol phenyl ether, diethylene glycol methyl ether, diethylene glycol ethyl ether, diethylene glycol propyl ether, diethylene glycol butyl ether, propylene glycol methyl ether, propylene glycol butyl ether, propylene glycol propyl ether, ethylene glycol dimethyl ether, ethylene glycol diethyl ether, ethylene glycol dibutyl ether, glymes, diethylene glycol diethyl ether, dibutylene glycol diethyl ether, diglymes, ethyl diglyme, butyl diglyme), and/or glycol ether acetates (for example 2-butoxyethyl acetate, diethylene glycol monoethyl ether acetate, diethylene glycol butyl ether acetate, propylene glycol methyl ether acetate), and/or a mixture of two or more of said abovementioned solvents. In a preferred embodiment according to the present invention, the ink comprises at least two polyols and/or polyol derivatives, preferably at least two glycol ethers. 2-(2-(2-Methoxyethoxy)ethoxy)ethanol, also known by the abbreviation TEGME, and 2-(2-butoxyethoxy)ethan-1-ol, also known under the name butyl carbitol, are two glycol ethers that are particularly suitable for the formulations according to the present invention.

According to one embodiment variant of the present invention, the ink composition also comprises at least one adhesion promoter consisting of a compound (p) whose concentration will preferably be greater than 0.01% by weight, for example between 0.1% and 5% by weight. Examples of adhesion promoters that will be mentioned include acrylic polymers, silanes, siloxanes and/or polysiloxanes, the aim of which is to improve the resistance to various types of mechanical stress, for example adhesion to numerous substrates. As illustrations of substrates that are particularly suitable for the claimed inks, mention will be made of the following: polyimide, polycarbonate, poly(ethylene terephthalate) (PET), polyethylene naphthalate (PEN), polyaryl ether ketone, polyester, heat-stabilized polyester, glass, ITO glass, AZO glass, SiN glass.

According to one embodiment variant of the present invention, the ink composition also comprises at least one rheology modifier consisting of a compound "f", a compound "g", or a mixture of the two, the total concentration of which in the ink will preferably be greater than 0.01% by weight, for example between 0.1% and 5% by weight.

Compound "f" according to the present invention consists of a rheology modifier selected, for example, from urea-type rheology modifiers. It is preferably selected from modified ureas, preferably polyureas, and/or mixtures thereof.

Compound "g" according to the present invention consists of a rheology modifier selected, for example, from cellulose-type rheology modifiers. Examples that will be mentioned include alkylcelluloses, nanocelluloses, preferably ethylcellulose, nitrocelluloses, and/or mixtures thereof.

A particular example of preparation of the ink according to the present invention is described for illustrative purposes below:

A mixture of all the alcohol solvents+water is prepared in a reactor with mechanical stirring. The adhesion promoter and/or the rheology modifier are then optionally added. The silver nanoparticles are then added to this mixture and stirring is continued for 3 hours. Ultrasonication is then performed for 15 minutes.

An additional advantage of the ink according to the present invention lies in the fact that its preparation may be performed under non-restrictive pressure and/or temperature conditions, for example under pressure and/or temperature conditions close or identical to normal or ambient conditions. It is preferable to remain at less than 40% of the normal or ambient pressure and/or temperature conditions. For example, the Applicant has found that it was preferable to maintain the pressure and/or temperature conditions during the preparation of the ink at values oscillating at a maximum of 30%, preferably of 15%, around the values for normal or ambient conditions. Controlling these pressure and/or temperature conditions may thus be advantageously included in the ink preparation device so as to meet these conditions. This advantage associated with preparation of the ink under non-restrictive conditions is obviously also reflected by facilitated use of said inks.

According to a particular embodiment of the present invention, the inks formulated according to the present invention have a content of less than 40% by weight of silver nanoparticles (compound "a"), preferably between 12.5% and 30% and more particularly between 15% and 25% by weight.

According to one embodiment of the present invention, the silver ink comprises
- a compound "a" (silver nanoparticles) in a content of between 15% and 25% by weight,
- a compound "e" (aliphatic monohydric alcohol, terpenic alcohol, and polyol and/or polyol derivative) in a content of between 60% and 80% by weight,
- a compound "W" (water) in a content of between 4% and 10% by weight, and
- a compound "p" (adhesion promoter) in a content of between 0.1% and 5% by weight.

Thus, according to the present invention, the sum of compounds "a", "e" and "W" constitutes at least 80% by weight of the ink composition. According to a particular variant of the present invention, the sum of compounds "a", "e", "f", "g", "W" and "p" will preferably constitute at least 85% by weight, preferably at least 90% by weight, for example at least 95% by weight, at least 98% by weight, at least 99% by weight or even 100% by weight of the final ink.

According to one embodiment of the present invention, since the ink incorporates water in a controlled concentration in its composition, greater flexibility is permitted regarding the selection of the solvents "e" chosen. Specifically, the components of the claimed ink may now comprise water without this disrupting the stability of the ink thus prepared; thus, it is no longer necessary to select solvents with a high degree of purity, which represents an additional advantage of the inks according to the present invention.

According to one embodiment of the present invention, the silver ink may also optionally comprise a compound "h" consisting of an antioxidant. Examples that will be mentioned include:
- ascorbic acid or vitamin C (E300), sodium ascorbate (E301), calcium ascorbate (E302), 5,6-diacetyl L-ascorbic acid (E303), 6-palmityl L-ascorbic acid (E304);
- citric acid (E330), sodium citrate (E331), potassium citrate (E332) and calcium citrate (E333);
- tartaric acid (E334), sodium tartrate (E335), potassium tartrate (E336) and potassium sodium tartrate (E337);
- butylhydroxyanisole (E320) and butylhydroxytoluene (E321);
- octyl gallate (E311) or dodecyl gallate (E312);
- sodium lactate (E325), potassium lactate (E326) or calcium lactate (E327);
- lecithins (E322);
- natural tocopherols (E306), synthetic α-tocopherol (E307), synthetic γ-tocopherol (E308) and synthetic δ-tocopherol (E309), the tocopherols together constituting vitamin E;
- eugenol, thymol and/or cinnamaldehyde,
- and also a mixture of two or more of said antioxidants.

Although this does not constitute a preferred embodiment according to the present invention, the ink compositions may also tolerate the presence of additional compounds, among which mention will be made for illustrative purposes of
- solvents. For example hydrocarbons; alkanes containing from 5 to 20 carbon atoms, of which mention will be made for illustrative purposes of pentane ($C_5H_{12}$), hexane ($C_6H_{14}$), heptane ($C_7H_{16}$), octane ($C_8H_{18}$), nonane ($C_9H_{20}$), decane ($C_{10}H_{22}$), undecane ($C_{11}H_{24}$), dodecane ($C_{12}H_{26}$), tridecane ($C_{13}H_{28}$), tetradecane ($C_{14}H_{30}$), pentadecane ($C_{15}H_{32}$), cetane ($C_{16}H_{34}$), heptadecane ($C_{17}H_{36}$), octadecane ($C_{18}H_{38}$), nonadecane ($C_{19}H_{40}$), eicosane ($C_{20}H_{42}$), cyclopentane ($C_5H_{10}$), cyclohexane ($C_6H_{12}$), methyl-cyclohexane ($C_7H_{14}$), cycloheptane ($C_7H_{14}$), cyclooctane ($C_8H_{16}$) (preferably when it is not used as compound "b"), cyclononane ($C_9H_{18}$), cyclodecane ($C_{10}H_{20}$); aromatic hydrocarbons containing from 7 to 18 carbon atoms, of which mention will be made for illustrative purposes of toluene, xylene, ethylbenzene, ethyltoluene; and mixtures thereof;
- dispersants, for example organic dispersants which comprise at least one carbon atom. These organic dispersants may also comprise one or more non-metallic heteroatoms such as a halogenated compound, nitrogen, oxygen, sulfur or silicon. Mention will be made for illustrative purposes of thiols and derivatives thereof, amines and derivatives thereof (for example amino alcohols and amino alcohol ethers), carboxylic acids and carboxylate derivatives thereof, and/or mixtures thereof.

According to one embodiment of the present invention, the ink may advantageously be used in contactless inkjet printing.

It is thus obvious to a person skilled in the art that the present invention allows embodiments in numerous other specific forms without, however, departing from the field of application of the invention as claimed. Consequently, the present embodiments should be considered as illustrations, but may be modified in the field defined by the scope of the attached claims.

The present invention and the advantages thereof will now be illustrated by means of the formulations collated in the tables below. The ink formulations were prepared in accordance with the embodiments described above in the description. The chemical compounds used and the properties are indicated in the table. F13 is a formulation in accordance with the present invention, whereas CF4 is a formulation not in accordance (absence of terpineol and of water) given for comparative purposes.

TABLES 1

| Weight % of the ink | Ag | Butyl Carbitol | Terpineol | TEGME | 1-Butanol | Water | Edaplan |
|---|---|---|---|---|---|---|---|
| Ref. F3 | 20.0 | 3.26 | 25.25 | 33.47 | 12.90 | 5.0 | 0.12 |

TABLES 2

| Weight % of the ink | % Ag | % Butyl Carbitol | %1-Butanol | % Hexylene glycol | % Dowanol PNB |
|---|---|---|---|---|---|
| Ref. CF4 | 20 | 3.26 | 4.90 | 38.37 | 33.47 |

The silver (Ag) nanoparticles are spheroidal and have a D50 of 50 nm.
Edaplan is Edaplan® LA 413 from the company Munzing Chemie GmbH; it is a modified organic polysiloxane.
TEGME is 2-(2-(2-methoxyethoxy)ethoxy)ethanol.
Butyl carbitol is 2-(2-butoxyethoxy)ethan-1-ol.

TABLES 3

| Reference | Viscosity (mPa · s) | Surface tension (mN/m) | % Ag by weight | Sheet resistance (mOhm/sq) |
|---|---|---|---|---|
| Ref. F3 | 12 | 28 | 20 | 250 |

The sheet resistance of the ink as mentioned in the present invention may be measured according to any suitable method. As an example corresponding to the measurements collated in the table, it may be advantageously measured according to the following method: An ink deposited by spincoater onto a substrate (600 rpm/3 min—for example glass), is subjected to annealing using a hotplate or an oven (150° C.). Analysis of the sheet resistance is performed under the following conditions:

Machine reference: S302 Resistivity Stand
4-point head reference SP4-40045TFY
Current source reference: Agilent U8001A
Multimeter reference: Agilent U3400
Measuring temperature: room temperature
Tension/resistance conversion coefficient: 4.5324

The content of silver nanoparticles as mentioned in the present invention may be measured according to any suitable method. As an example corresponding to the measurements collated in the table, it may be advantageously measured according to the following method:

Thermogravimetric analysis
Machine: TGA Q50 from TA Instrument
Crucible: Alumina
Method: ramp
Measuring range: from room temperature to 600° C.
Temperature rise: 20° C./min The viscosity of the ink as mentioned in the present invention may be measured according to any suitable method. As an example, it may be advantageously measured according to the following method:

Machine: AR-G2 rheometer from TA Instrument
Conditioning time: Pre-shear at 40 $s^{-1}$ for 1 minute/equilibration for 1 minute
Test type: Shear stages
Stages: 40 $s^{-1}$, 100 $s^{-1}$ and 1000 $s^{-1}$
Duration of a stage: 5 minutes
Mode: linear
Measurement: every 10 seconds
Temperature: 20° C.
Curve reprocessing method: Newtonian
Reprocessed area: the entire curve The surface tension as mentioned in the present invention may be measured according to any suitable method. As an example, it may be advantageously measured according to the following method:

Machine: OCA 15 from Apollo Instrument
Method:
Pendant drop (left)
Measuring volume: 0.2 µL
Flow rate: 0.5 µL/s
1.65 mm needle
Enter the ink density: 1.1675
Measurement: Ink volume: 1 mL of ink/number of measurements=4

The inkjet prints were produced with a KSCAN printer from Kelenn Technology.
Resolution: 600×1200 dpi
Substrate: Folex CF-T1/PD
Number of layers: 1

The ink compositions according to one variant of the present invention are characterized in that their sheet resistance property value is less than 350 mohms/sq for thicknesses of less than or equal to 300 nm (annealing temperature of 150° C.).

A comparison of the prints made with the above two formulations represents a good example of visualization of the advantages afforded by the present invention; specifically, a marked improvement in the print resolution of formulation F3 relative to that of CF4 is observed.

What is claimed is:

1. An ink composition comprising
   1. one compound "a" consisting of silver nanoparticles,
   2. one compound "e" consisting of a mixture of solvents, and
   3. one compound "W" consisting of water, wherein
      A. compound "a" constitutes at least 10% by weight of the ink composition,
      B. compound "e" constitutes at least 55% by weight of the ink composition and consists of
         B.1. at least one aliphatic monohydric alcohol, and
         B.2. at least one terpenic alcohol, and
         B.3. at least one polyol and/or one polyol derivative, and
      C. compound "W" constitutes at least 2.5% by weight of the ink composition, and
      D. the sum of compounds "a", "e" and "W" constitutes at least 80% by weight of the ink composition.

2. The ink composition according to claim 1, in which the water concentration is at least 4% by weight and is less than 10% by weight.

3. The ink composition according to claim 1, in which the concentration of silver nanoparticles is between 15% and 25% by weight.

4. The ink composition according to claim 1, in which the concentration of aliphatic monohydric alcohol is at least 10% by weight and is less than 20% by weight.

5. The ink composition according to claim 1, in which the concentration of terpenic alcohol is at least 15% by weight and is less than 30% by weight.

6. The ink composition according to claim 1, in which the concentration of polyol and polyol derivative is at least 30% by weight and is less than 45% by weight.

7. The ink composition according to claim 1, in which the aliphatic monohydric alcohol is selected from the group consisting of ethanol, propanol, butanol, pentanoland, hexanoland, isopropanol, n-butanol, tert-butanol, and/or a mixture of two or more of said abovementioned aliphatic monohydric alcohols.

8. The ink composition according to claim 1, in which the terpenic alcohol is selected from menthol, nerol, cineol, lavandulol, myrcenol, terpineol, alpha-terpineol, beta-terpineol, gamma-terpineol, and/or terpinen-4-ol, isoborneol, citronellol, linalool, borneol, geraniol, and/or a mixture of two or more of said abovementioned alcohols.

9. The ink composition according to claim 1, in which the polyol and/or polyol derivative has a boiling point of less than 260° C.

10. The ink composition according to claim 1, in which the polyol is a glycol and the polyol derivative is a glycol ether.

11. The ink composition according to claim 1, in which the polyol is absent and the polyol derivative consists of a mixture of glycol ethers.

12. The ink composition according to claim 11, wherein the polyol derivative comprises 2-(2-(2-methoxyethoxy)ethoxy)ethanol and 2-(2-butoxyethoxy)ethan-1-ol.

13. The ink composition according to claim 1, comprising a compound "p" consisting of an adhesion promoter selected from acrylic polymers, silanes, siloxanes and/or polysiloxanes and the concentration of which is between 0.1% and 5% by weight.

14. The ink composition according to claim 1, having a viscosity measured at 20° C. of between 5 and 25 mPa·s.

15. The ink composition according to claim 1, characterized in that the silver nanoparticles (compound "a") are spheroidal and have D50 values of between 10 and 150 nm.

16. The ink composition according to claim 1, wherein the ink is used in contactless inkjet printing.

* * * * *